Dec. 6, 1966  D. C. SORENSON ETAL  3,289,238
MOBILE AUTOMATIC STEAM CLEANING UNIT
Filed Nov. 20, 1964
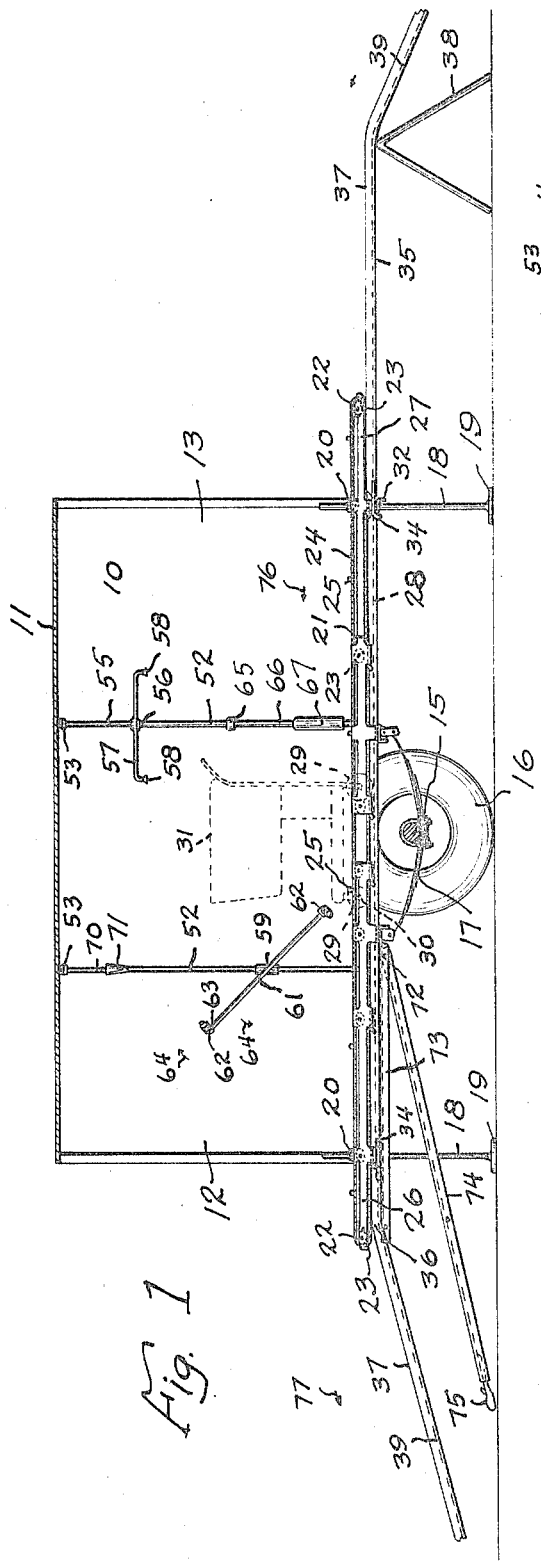
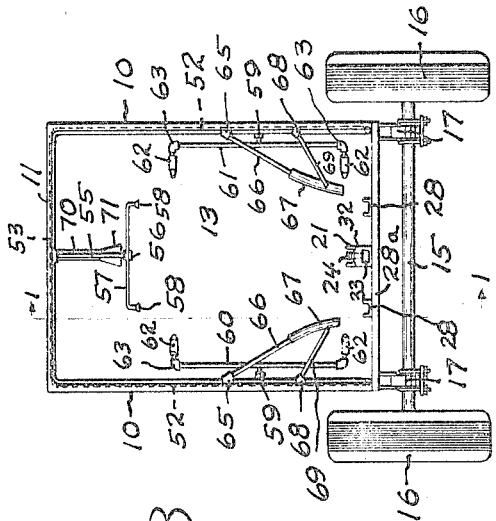
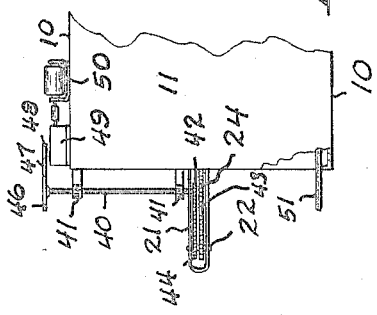
INVENTORS
Dale C. Sorenson
BY Clayton G. Keiser
Sam J. Slotsky
ATTORNEY

United States Patent Office

3,289,238
Patented Dec. 6, 1966

3,289,238
MOBILE AUTOMATIC STEAM CLEANING UNIT
Dale C. Sorenson, Beresford, and Clayton G. Keiser,
Alcester, S. Dak.
Filed Nov. 20, 1964, Ser. No. 412,696
1 Claim. (Cl. 15—306)

Our invention relates to a mobile steam cleaning unit.

An object of our invention is to provide a steam cleaning unit which can be transported wherever desired, and which can be principally used for completely cleaning wire shopping carts or other devices.

A further object of our invention is to provide such a unit in a structure wherein the shopping carts can be conveniently placed on an automatic conveyor arrangement which will convey the carts in sequence through the steam cleaning devices.

A further object of our invention is to provide an efficient steam cleaning arrangement which will insure that all of the upper as well as the lower parts of the carts are thoroughly cleaned and sterilized.

A further object of our invention is to provide a unit having adjustable features, as well as other advantages.

With these and other objects in view, our invention consists in the construction, arrangement, and combination of the various parts of our device, whereby the objects contemplated are attained, as hereinafter more fully set forth, pointed out in our claim, and illustrated in the accompanying drawings, in which:

FIGURE 1 is a sectional view taken through the device substantially along the lines 1—1 of FIGURE 3, FIGURE 2 is a plan view showing a portion of the device and the driving arrangement, and FIGURE 3 is a rear view of the unit.

Our invention contemplates an efficient arrangement for completely cleaning all of the interstices and other portions of shopping carts or other devices and wherein the action is entirely automatic in that the cars can be fed into the unit and will come out completely cleaned and sterilized, thereby providing a desirable arrangement and eliminating the cumbersome method of cleaning a shopping cart for instance wherein the operator must guide the steam cleaning nozzles or other unit by hand and the like.

In describing our invention we have used the character 10 to designate the side walls of a portable unit, the character 11 indicating a top wall, the character 12 indicating a forward opening, and the character 13 a rear opening.

The unit is suitably mounted on the axle 15 and the wheels 16, the character 17 indicating suspension springs, and we have further used the character 18 to designate support posts mounted in the corners of the housing, the posts 18 including the expanded portions 19, the posts 18 being received within suitable collars 20 having pins or other attaching arrangements therein for securing the members 18.

We have further used the character 21 to designate a suitable framework in which are journalled the shafts 22 attached to the sprockets 23, and engaging the sprockets 23 is a continuous sprocket chain 24 having the small lugs 25 attached thereto, the characters 26 and 27 indicating extending framework portions. The character 28 indicates a pair of lengthened channel members for receiving the wheels 29 of a shopping cart, the channel members 28 being supported on the transverse bars 28a. The character 30 indicates the forward shaft portion of a shopping cart, the character 31 indicating further shopping cart portions.

The character 32 indicates framework portions attached to the bars 28a and the character 33 indicates open slot portions therein adapted to receive the tongues 34 which tongues are integral portions of the ramp members 35 and 36, the members 35 and 36 having the side flanges 37, it being noted that the engagement of the tongues 34 with the slots 33 will provide means for conveniently attaching the ramps 35 and 36 as shown in FIGURE 1. The member 38 indicates a support for the ramp 35, the ramps having the inclined portions 39.

The sprocket chain 24 is driven by means of a shaft 40 journalled at 41, which shaft 40 drives a sprocket 42 which drives a further sprocket chain 43, which drives the sprocket 44, which drives the shaft 22 attached to an end sprocket 23, the shaft 40 being driven by means of a suitable pulley 46 engaging a belt 47 which engages the pulley and shaft arrangement at 48, the character 49 indicating a gear housing driven by the electric motor 50. The character 51 indicates a steam line or pipe which can be connected to any suitable type of steam generating arrangement which provides steam under pressure, and the pipe 51 is suitably connected to the further pipes such as 52, 53, etc., the character 55 indicating a further pipe, and rotatably mounted on the pipe 55 at 56 is a tube 57 terminating in the steam emitting jets 58.

Communicating with the pipes 52 at 59 and rotatably mounted therewith are the further tubes 60 and 61 which terminate in the jet members 62, the members 62 being inclined at an angle and yet substantially toward the plane of the side walls 10 so that when the steam passes through the jets 62 it will cause rotation of the tubes 60 and 61, and the speed of rotation can be adjusted by slightly rotating the jet members 62 on their connections 63 to change the angle.

The jet members 62 are purposely set so that the units 60 and 61 will rotate in opposite directions to each other as shown by the arrows 64 in FIGURE 1, and we have found that this opposite rotation of these members provides a more efficient cleaning action, etc. Attached to the pipe lines 52 at 65 are the angularly extending tubes 66 which terminate in the flexible lower hoses 67 which are open at their lower ends, and attached at 68 are the further angularly inclined tubes 69. Communicating to the upper pipe structure is a vertical tube 70 which communicates with the flared jet member 71 which ejects steam through the bottom thereof downwardly. Pivoted at 72 to a portion 73 of the framework is a folding tongue 74 having the end portion 75 which can be attached to a towing vehicle when desired.

The unit is operated in the following manner:

The shopping carts are moved up the inclined ramp 39 and onto the ramp portion 37 and the forward axle portions 30 of the carts are placed ahead of the lugs 25 and are placed in sequence whereby they will be pulled in the direction of the arrow 76 through the steam cleaning members which are started as well as the motor 50 whereby a great many carts will be accommodated in an automatic manner. The steam is admitted by means of any suitable valve arrangement, etc., through the pipe 51 and into the entire pipe-work structure described, wherein the rotating jets 62 will constantly apply the hot steam under pressure to the cart portions, the opposite rotation of the members 60 and 61 providing a very efficient cleaning action as explained. Also, the member 71 will eject the steam downwardly to clean further portions of the carts, and the flexible tubes 67 will allow passage of the steam onto the lower portions of the carts including the wheels, and since the tubes 67 are flexible, they will vibrate due to the applied pressure and will thereby provide an efficient cleaning action in conjunction with the tubes 69. Also, the rotating pipes 57 will constantly apply downwardly extending jets of steam, so that by the combined action of all of these members, the carts will be efficiently and thoroughly cleaned and sterilized, and will then pass in the direction of the arrow 77 downwardly along the ramp 36, 37 where they are then discharged and ready for use again We have found that for efficient cleaning of all of the portions of the carts, a complete action both stationary and rotational is necessary from sources completely surrounding the carts to provide the best results, which are provided by means of the structure described.

The jets 62 when inclined away from the plane of the walls 10 will rotate the pipes 60 and 61 at a slower speed and this speed can then be adjusted correspondingly as explained heretofore.

The entire unit can be drawn to any desired location by any type of vehicle and then set up for operation. It will be noted that the bottom of the housing is practically completely open which prevents accumulation of steam or condensation.

It will now be noted that we have provided the advantages mentioned in the objects of our invention with further advantages being apparent.

Some changes may be made in the construction and arrangement of the parts of our invention without departing from the real spirit and purpose of our invention, and it is our intention to cover by our claim any modified forms of structure or use of mechanical equivalents which may be reasonably included within their scope.

We claim as our invention:

A mobile automatic steam cleaning unit comprising a housing having a top wall and side walls, channel members positioned at the lower portions of said housing for receiving wheeled devices thereon, an endless chain mounted between said channels, means attached to said endless chain for engaging portions of said wheeled devices for moving said wheeled devices, steam ejecting means positioned within said housing and directed against said wheeled devices, said steam ejecting means including oppositely positioned rotating tubes for receiving steam, steam ejecting nozzles attached to the ends of said tubes, said tubes being rotatable in opposite directions, means for adjustably rotating said nozzles on said tubes for adjusting the speed of rotation of said tubes, an upper steam conducting rotatable tube attached to and positioned within said housing and positioned in a horizontal plane for providing means for ejecting steam downwardly, further tubes for conveying steam including flexible end tubes, said flexible end tubes providing means for cleaning lower portions of said wheeled devices and whereby said flexible end tubes will vibrate, still further tubes conveying steam positioned adjacently to said flexible end tubes, said housing having an open bottom, ramp members removably attached adjacently to said channel members, support members for attachment to said housing at the corners thereof for supporting said housing during operation of said unit.

References Cited by the Examiner

UNITED STATES PATENTS

| | | | |
|---|---|---|---|
| 1,628,141 | 5/1927 | Gray | 134—179 X |
| 1,928,683 | 10/1933 | Cammann | 134—176 X |
| 2,744,532 | 5/1956 | Zademach | 134—179 |
| 2,936,770 | 5/1960 | Emanuel | 134—123 |
| 2,997,048 | 8/1961 | Gertken et al. | |
| 3,017,122 | 1/1962 | Malsbary | 134—45 X |
| 3,096,775 | 7/1963 | Clarke et al. | 134—123 |
| 3,179,117 | 4/1965 | Gibson et al. | 134—123 X |

CHARLES A. WILLMUTH, *Primary Examiner.*

R. L. BLEUTGE, *Assistant Examiner.*